US010252942B2

(12) United States Patent
Chao (10) Patent No.: US 10,252,942 B2
(45) Date of Patent: Apr. 9, 2019

(54) FIBER CONTAINING AQUEOUS FOAM COMPOSITE, THE PROCESS AND USE

(71) Applicant: Allied Foam Tech Corp., Montgomeryville, PA (US)

(72) Inventor: Yen-Yau Harrison Chao, Harleysville, PA (US)

(73) Assignee: ALLIED FOAM TECH CORP., Montgomeryville, PA (US)

( * ) Notice: Subject to any disclaimer, the term of this patent is extended or adjusted under 35 U.S.C. 154(b) by 106 days.

(21) Appl. No.: 15/196,214

(22) Filed: Jun. 29, 2016

(65) Prior Publication Data
US 2016/0376193 A1 Dec. 29, 2016

Related U.S. Application Data

(60) Provisional application No. 62/186,092, filed on Jun. 29, 2015.

(51) Int. Cl.
*B32B 38/10* (2006.01)
*C04B 16/06* (2006.01)
(Continued)

(52) U.S. Cl.
CPC .......... *C04B 16/0641* (2013.01); *B32B 13/04* (2013.01); *B32B 15/08* (2013.01);
(Continued)

(58) Field of Classification Search
CPC ....... B32B 13/04; B32B 15/08; B32B 17/064; B32B 16/0641; B32B 16/0633;
(Continued)

(56) References Cited

U.S. PATENT DOCUMENTS 3,725,095 A * 4/1973 Weidman ............... A01N 25/16
106/603
4,340,510 A * 7/1982 Howanietz ............. C04B 28/02
156/337
(Continued)

FOREIGN PATENT DOCUMENTS

CN 1978373 * 6/2007 ............ C04B 14/04
DE 3445484 10/1985
(Continued)

OTHER PUBLICATIONS

Database WPI, Week 201016, Jan. 20, 2010, Thomson Scientific, AN 2010-B26163, XP002762122, CN 101 628 798 A (Jiangxi Big Blue New Material Co Ltd), Abstract.
(Continued)

*Primary Examiner* — Patricia L. Hailey
(74) *Attorney, Agent, or Firm* — STIP Law Group, LLC (57) ABSTRACT

Foamed fiber compositions and processes of making said compositions. Compositions include a hydraulic mixture including (i) a polymer and (ii) one or more of gypsum, fly ash, and cement; and a foam including a foaming agent, a foam stabilizer, and 0.5-35% fibers by weight. The process for forming the foamed fiber composition includes providing a stable foam including a foaming agent and a foam stabilizer; mixing fibers into the stable foam until the fibers are uniformly distributed in the foam to form a fiber-containing foam, wherein the fiber-containing aqueous foam contains 0.5-35% fibers by weight; and mixing the fiber-containing foam into a hydraulic slurry including (i) a polymer and (ii) one or more of gypsum, fly ash, and cement. The composition is suitable for use in roof tiles, underlayments, backerboards, cement composites, foam fills, bricks, cement sidings, etc.

26 Claims, 1 Drawing Sheet

(51) Int. Cl.
    *B32B 13/04* (2006.01)
    *B32B 15/08* (2006.01)
    *B32B 17/06* (2006.01)
    *C04B 14/36* (2006.01)
    *C04B 18/08* (2006.01)
    *C04B 24/20* (2006.01)
    *C04B 38/10* (2006.01)
    *E04D 1/22* (2006.01)
    *E04D 1/28* (2006.01)
    *C04B 28/02* (2006.01)
    *C04B 28/14* (2006.01)
    *C04B 40/00* (2006.01)
    C04B 103/42 (2006.01)
    C04B 103/48 (2006.01)
    C04B 111/40 (2006.01)

(52) U.S. Cl.
    CPC ......... *B32B 17/064* (2013.01); *C04B 14/365* (2013.01); *C04B 16/0633* (2013.01); *C04B 18/08* (2013.01); *C04B 24/20* (2013.01); *C04B 28/02* (2013.01); *C04B 28/14* (2013.01); *C04B 38/10* (2013.01); *C04B 40/0039* (2013.01); *C04B 40/0046* (2013.01); *E04D 1/22* (2013.01); *E04D 1/28* (2013.01); *B32B 2250/02* (2013.01); *B32B 2262/0223* (2013.01); *B32B 2262/0253* (2013.01); *B32B 2262/101* (2013.01); *B32B 2305/022* (2013.01); *B32B 2307/54* (2013.01); *B32B 2419/00* (2013.01); *B32B 2419/02* (2013.01); *B32B 2419/06* (2013.01); *C04B 2103/42* (2013.01); *C04B 2103/48* (2013.01); *C04B 2111/40* (2013.01); *Y02W 30/92* (2015.05)

(58) Field of Classification Search
    CPC ......... B32B 18/08; B32B 24/20; B32B 28/02; B32B 28/14; B32B 38/10; B32B 40/0039; B32B 40/0046
    USPC ....... 501/95.2; 106/672, 680, 705, 709, 715, 106/735, 819–820; 428/613, 36.5
    See application file for complete search history.

(56) References Cited

U.S. PATENT DOCUMENTS

| | | | | |
|---|---|---|---|---|
| 5,110,839 | A * | 5/1992 | Chao | C04B 24/2641 521/149 |
| 5,820,670 | A * | 10/1998 | Chatterji | C04B 24/124 106/672 |
| 6,605,343 | B1 * | 8/2003 | Motoi | B32B 27/04 428/107 |
| 8,070,876 | B1 * | 12/2011 | Jiang | C04B 20/1033 106/638 |
| 2003/0125404 | A1 | 7/2003 | Hilton et al. | |
| 2004/0149170 | A1 | 8/2004 | Moran | |
| 2006/0147681 | A1 * | 7/2006 | Dubey | C04B 16/0641 428/192 |
| 2007/0044965 | A1 * | 3/2007 | Middaugh | C09K 8/703 166/280.2 |
| 2007/0056481 | A1 | 3/2007 | Gray | |
| 2009/0229492 | A1 | 9/2009 | Mills | |
| 2010/0139523 | A1 | 6/2010 | Gray | |
| 2010/0310846 | A1 * | 12/2010 | Berke | C04B 28/04 428/219 |
| 2014/0371351 | A1 * | 12/2014 | Dantin | C04B 28/02 524/5 |
| 2015/0322195 | A1 * | 11/2015 | Makida | C08J 9/144 521/103 |
| 2017/0226407 | A1 * | 8/2017 | Homma | C09K 8/60 |

FOREIGN PATENT DOCUMENTS

| | | | |
|---|---|---|---|
| EP | 430575 A1 * | 6/1991 | ............ C04B 24/26 |
| EP | 1568671 | 8/2005 | |
| FR | 2963002 | 1/2012 | |
| JP | 03199177 A * | 8/1991 | ............ C04B 24/26 |
| WO | 98/51639 | 11/1998 | |
| WO | 99/08979 | 2/1999 | |
| WO | 2010/141032 | 12/2010 | |
| WO | 2011/044605 | 4/2011 | |
| WO | 2014/172469 | 10/2014 | |

OTHER PUBLICATIONS

Inao, M. et al., "Manufacture of lightweight aerated concrete with controlled demolding time," Chemical Abstracts, vol. 113, No. 10, Sep. 3, 1990, p. 345.
International Search Report issued by the European Patent Office and dated Sep. 29, 2016.

* cited by examiner

FIBER CONTAINING AQUEOUS FOAM COMPOSITE, THE PROCESS AND USE

CROSS REFERENCE TO RELATED APPLICATIONS

This application claims priority to U.S. Provisional Patent Application No. 62/186,092 titled "FIBER CONTAINING AQUEOUS FOAM COMPOSITE, THE PROCESS AND USE," filed on Jun. 29, 2015, the contents of which are hereby incorporated by reference in this document, in their entirety and for all purposes.

FIELD OF INVENTION

This invention relates to a composite of high fiber containing aqueous composition comprising fibers, polymers, aqueous foam, and cement-fly ash or gypsum-fly ash slurries, to a process for preparing such foamed slurries, and to applications for using them.

BACKGROUND OF THE INVENTION

In the last two decades, organic and mineral fibers such as polyvinyl alcohol, nylon, polypropylene, basalt, rayon, cellulose, steel, wood, aramid, polyester, acrylic, and others are able to be spun into very different deniers or dtex numbers and cut to different lengths. These fibers have high fiber strength and those with low dtex or fine deniers also have a great number of fibrils per unit weight that allows very cost effective means of using such fibers. However, such fibers with fine fibrils have a high tendency to form fiber lumps or fiber balls when they are added into cement or concrete slurries in a typical mortar or concrete mixer. Thus very low percentage (<0.3%) of such fibers could be used in these hydraulic materials even with the mixing aids such as fillers or granules, so the full advantage of these fibers can never be realized. In order to increase the amount of fiber loadings in the hydraulic slurries to achieve the desired tensile strength and free of shrinkage cracking high denier and stiffer fibers have thus been tried. However, the significantly reduced number of fibrils per unit weight of these high denier fibers made them very expensive to use and the efficiency is also low relative to those with finer deniers. So a method or process that could allow uniform distribution of fibers of very fine denier and at high percentage is highly desirable for the cement based building products where high tensile strength without shrinkage cracking is desired.

Fly ash is often produced by the combustion of coal. Enormous amounts of fly ash are produced annually worldwide. Disposal of fly ash poses an increasingly difficult problem because the volume, the particulate nature and the varied chemical composition of fly ash. Fly ash of particular composition, such as fly ash F and fly ash C, has been used as an additive in Portland cement to reduce the raw material cost, but often at less than 30%, because such coal burning byproducts are not self-activating and often needs excess lime or other activator when higher amount of fly ash is used in the cement slurry.

U.S. Pat. No. 7,468,154, using high shear mixing, presented a preparation consisted of high polymer containing fly ash C composite that shows high bendability. However, the addition of Portland cement into the fly ash C, as stated in the patent, resulted in shrinkage cracking in a matter of hours after casting. Such high shear blending of a hydraulic slurry shown in this reference or any other conventional mixing techniques for high solid cement or gypsum slurries will not allow greater than 0.3% fiber, especially low dtex fibrils, to be incorporated into the slurry without fiber balling or lump formation. Without sufficient fiber presence, such cement, cement-fly ash blends and composites are crack prone and are unable to reach high modulus of elasticity and/or compressive strength for many building material applications.

Conventional incorporation of foam into a cement or concrete slurry is through foam generators, compressed air and low shear mixing. The high shear mixing described in U.S. Pat. No. 7,468,154 will essentially destroy most of the preformed foam in the slurry during the mixing, and is thus not applicable for making foamed hydraulic composites where preformed foam is used.

It is well known that the presence of polymers or polymer dispersions in the cementitious composites will greatly improve cement hydration in thin cast applications, and the polymer will improve the adhesion in concrete repairs where fresh concrete is applied onto the surface of old concrete. However, the polymer additives in a typical cement dominant composition have very little effect in enhancement of tensile or bending strength due to the inherent brittleness and high crystalline content associated with the typical hydrated cement. U.S. Pat. No. 4,352,856 and U.S. Pat. No. 7,468,154 showed that, using only fly ash and >10% by dry weight of polymers or resins, such cement-free composite could develop good bendability or moderate tensile strength. However, without proper activation of the fly ash by cement or base such low tensile strength still prevents it from being qualified for a lot of building product applications where high modulus of rupture and high compressive strength are required. The high amount of polymer used in U.S. Pat. No. 7,468,154 may increase not only the raw material cost of a cementitious material, but also the flammability of the resulting composites that many cementitious building materials try to avoid. So a lower polymer usage yet being able to achieve high modulus of rupture (MOR) and high compressive strength is highly desirable.

The use of low level of fly ash (<30%) in cement to reduce cost and yet not significantly affecting the rate of cement set and long term compressive strength is well known. In high fly ash (>40%) cement compositions there are references using various additives such as alkali silicate (U.S. Pat. No. 4,696,698, U.S. Pat. No. 7,727,330), alkali carbonate (U.S. Pat. No. 7,727,330), lithium carbonate (U.S. Pat. No. 6,251,178), citrates (U.S. Pat. No. 8,366,823) or others to activate the fly ash and reduce the set time or increase the rate of strength development. But the inherent brittleness, low tensile strength and the lack of good water resistance associated with typical cement and concrete compositions are not addressed in these references.

SUMMARY OF INVENTION

A high fiber containing lightweight cement-fly ash or gypsum-fly ash composition with uniform fiber distribution is made from low shear mixing of (A). a cement-fly ash or gypsum-fly ash slurry, and (B). A preformed aqueous foam containing organic or mineral fibers. The cement-fly ash mix in (A). comprises polymer dispersion, a cement and fly ash mixture or a gypsum and fly ash mixture, and the high fiber containing preformed foam (B). is made by a process of adding fibers to a preformed aqueous foam under low shear mixing. The high fiber and polymer containing cement-fly ash composition can also be made by adding fibers to a foamed cement and fly ash slurry consisted of foam, polymer dispersion, cement and fly ash.

The high fiber and polymer containing lightweight cement-fly ash composition, with its lightweight, high tensile and compressive strengths, free of shrinkage cracking, ease of handling and trimming, high adhesion to granules, coatings and various metallic and non-metallic surfaces, high flexibility, water resistance and exterior durability, can be used in the manufacture of metallic and concrete roof tiles, roof shakes, flexible asphalt-free roof shingles, roof underlayment, exterior and interior wall wrappings, sandwiched cement-foam boards, cement backerboards, decorative stones, lightweight bricks and blocks.

It is an objective of this invention to provide a process involving an aqueous foam and fibers that allows high amount of fibers with very different deniers or dtex numbers to be uniformly distributed in the foam mix.

It is an objective of this invention to provide a high fiber containing foam that is very useful as an effective rheology modifier, slump control additive and an easy means to uniformly incorporating high amount of fibers into various hydraulic cementitious and gypsum type slurries. The high fiber content (0.5%-15%) hydraulic slurry with uniformly distributed fiber or fibrils can easily be made by this novel process and the hydraulic composite will harden to a building material with high tensile and bending strengths without any shrinkage cracking.

It is an objective of this invention to provide a polymer and fiber modified lightweight cement-fly ash composition for precast or cast-in-place applications and the hardened composites are totally crack-free with very high MOR, high water resistance, bendability and great adhesion characteristics not achievable by conventional hydraulic cementitious or fly ash compositions.

It is another objective of this invention to develop a foamed cement-fly ash composite where great flexural strength and high water resistance can be achieved without using excessive amount of polymers in the hydraulic composites.

It is yet another objective of this invention to develop the various lightweight cement, fly ash and gypsum products and composites from a foamed fiber process with moderate to high polymer content and moderate to high fly ash content.

It is yet another objective of this invention to develop cementitious tile backerboard with high water resistance, high modulus of rupture, toughness and flexibility for use in curved areas and yet produce high adhesion for coatings, good bonding to granules, pigment, scrims and fiberglass mat commonly used in the backerboard industry.

It is yet another objective of this invention to provide flexible, UV (ultraviolet) stable and water resistant roofing materials such as non-asphalt roof shingles, roof underlayment, roof shakes with good coloring capacities and toughness, lightweight metal shingles and tiles with desirable contours and flexibility.

It is yet another objective of this invention to develop exteriorly and interiorly durable and flexible wall coverings or wall wraps that are highly appealing and with UV stability, water resistance. These highly decorative sheets, with their flexibility and high tensile strength, can easily form crack-free rolls or other shapes for ease of transportation and handling. The exterior durable roll-forming sheet can be coated with paint, colored stones of various patterns on its top surface as exterior or interior decorative wall wraps or wall covering. The resulting composites are light, water resistant, strong and flexible for curved contours in various indoor and outdoor installations, bathroom, showers and other applications.

It is yet another objective of this invention to develop various lightweight, fire resistant and high tensile strength cast stones or large panels of cast stone patterns for the architectural or decorative stones industry.

It is yet another objective of this invention to develop various shapes and thickness of tough bricks, blocks or other simulated stone paving blocks with required mechanical strength but with significantly reduced weight.

It is yet another objective of this invention to develop an exteriorly durable, flexible, water resistant and lightweight cementitious coating for various lightweight foam boards such as polystyrene and polyurethane foam boards for various wall coverings.

DETAILED DESCRIPTION OF THE INVENTION

Embodiments of the invention include foamed fiber compositions including a hydraulic mixture including (i) a polymer and (ii) one or more of gypsum, fly ash, and cement; and a foam including a foaming agent, a foam stabilizer, and 0.5-35% fibers by weight. The aqueous foam may include 5-90% by volume of the composition. The foaming agent may have the general formula (I):

(I)

where R is an aliphatic hydrocarbon radical having from 8 to 24 carbon atoms; $R_1$ is selected form the group consisting of an alkyl group having from 1-16 carbon atoms, a hydroxyalkyl group having from 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1-6 carbon atoms, a hydroxyalkyl group having from 1-6 carbon atoms, a benzyl group, a hydrogen atom, a group which, when taken together with the nitrogen, represents a heterocyclic radical, and any of such groups having a hydrogen atom replaced by a fluorine atom. The foam stabilizer may have the general formula (II):

$$R'-X_2^-Y^+ \qquad (II)$$

where R' is an aliphatic hydrocarbon radical with 10 to 24 carbon atoms; $X_2$ is an anionic group selected from the group consisting of carboxylate, sulfate, sulfonate, and phosphate; and Y is a cationic counter ion selected from the group consisting of ammonium, sodium, and potassium salt. The fibers may have a fineness of 2-350 dtex. The fibers may polyvinyl alcohol, nylon, polypropylene, basalt, rayon, cellulose, steel, wood, aramid, polyester, and acrylic. The fly ash may include fly ash F, fly ash C, or a mixture thereof and the cement may be portland cement. The polymer has a concentration of up to 30% by dry weight of the hydraulic substance. The polymer may be selected from the group consisting of polyurethane, polyacrylic copolymers, ethylene vinyl acetate copolymers, synthetic and natural rubber emulsions, polyisocyanate dispersions, aqueous urea formaldehyde solutions, and mixtures thereof. The composition may further include alkali citrates, silicates, calcium carbonate, lithium carbonate, or mixtures thereof as a fly ash activator; kaolin, metakaolin, silica fume, limestone; or mixtures thereof as a rheology modifier; expanded clays, furnace slags, pumice, polystyrene beads, vermiculite, expanded shales, or mixtures thereof as an aggregate material; and/or a plasticizer or superplasticizer. The composition may be incorporated into a flexible, water resistant and weather resistant roof tile composite having a thickness of 100-150 mm with the composition surrounding a fiberglass mat core. The composition may be incorporated into a flexible, water resistant and weather resistant roof tile composite with the composition applied to a metallic backing. The composition may be incorporated into a flexible, water resistant and weather resistant underlayment including the composition applied to a fiberglass mat or scrim, the underlayment having a thickness of 50-155 mm. The composition may be incorporated into a strong and lightweight cement backerboard including the foamed fiber composition sandwiched between a first fiberglass scrim or mat and a second fiberglass scrim or mat. The composition may be incorporated into a flexible, abrasion resistant and lightweight foamed cement composite including the foamed fiber composition applied to an alkali-resistant fiberglass scrim or mat. The composition may be incorporated into a flexible foamed cementitious composite including the foamed fiber composition applied to an organic panel. The composition may be incorporated into a foam fill for sandwich panels, wall cavities, flooring, and roof coatings. The composition may be incorporated into a brick or cement siding.

Embodiments further include processes for forming a foamed fiber composition including providing a stable foam including a foaming agent and a foam stabilizer; mixing fibers into the stable foam until the fibers are uniformly distributed in the foam to form a fiber-containing foam, wherein the fiber-containing aqueous foam contains 0.5-35% fibers by weight; and mixing the fiber-containing foam into a hydraulic slurry including (i) a polymer and (ii) one or more of gypsum, fly ash, and cement. The aqueous foam may include 5-90% by volume of the composition. The foaming agent may have the general formula (I):

(I)

where R is an aliphatic hydrocarbon radical having from 8 to 24 carbon atoms; $R_1$ is selected form the group consisting of an alkyl group having from 1-16 carbon atoms, a hydroxyalkyl group having from 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1-6 carbon atoms, a hydroxyalkyl group having from 1-6 carbon atoms, a benzyl group, a hydrogen atom, a group which, when taken together with the nitrogen, represents a heterocyclic radical, and any of such groups having a hydrogen atom replaced by a fluorine atom. The foam stabilizer may have the general formula (II):

where R' is an aliphatic hydrocarbon radical with 10 to 24 carbon atoms; $X_2$ is an anionic group selected from the group consisting of carboxylate, sulfate, sulfonate, and phosphate; and Y is a cationic counter ion selected from the group consisting of ammonium, sodium, and potassium salt. The fibers may have a fineness of 2-350 dtex. The fibers may polyvinyl alcohol, nylon, polypropylene, basalt, rayon, cellulose, steel, wood, aramid, polyester, and acrylic. The fly ash may include fly ash F, fly ash C, or a mixture thereof and the cement may be portland cement. The polymer has a concentration of up to 30% by dry weight of the hydraulic substance. The polymer may be selected from the group consisting of polyurethane, polyacrylic copolymers, ethylene vinyl acetate copolymers, synthetic and natural rubber emulsions, polyisocyanate dispersions, aqueous urea formaldehyde solutions, and mixtures thereof. The process may further include incorporating one or more of the following into the composition: alkali citrates, silicates, calcium carbonate, lithium carbonate, or mixtures thereof as a fly ash activator; kaolin, metakaolin, silica fume, limestone; or mixtures thereof as a rheology modifier; expanded clays, furnace slags, pumice, polystyrene beads, vermiculite, expanded shales, or mixtures thereof as an aggregate material; and/or a plasticizer or superplasticizer. The fibers may be mixed into the stable aqueous foam at a rotation speed of less than 300 rotations per minute.

The aqueous foam process of this invention may comprise a preformed aqueous foam and the addition of organic or mineral fibers into the preformed foam. Various surfactant or hydrolyzed protein foaming agents from Allied Foam Tech, Elastizell or Cellucrete can be used in making the preformed foam. A two parts foam system from Allied Foam Tech is particularly preferred because of the extremely stable foam produced by this two parts system. This foam system is consisted of a foam agent (1) and a foam stabilizer (2).

The foam agent (1) is prepared by a preformed foam composition formed of a long-chain organic cation-forming compound having the general formula (I):

where R is an aliphatic hydrocarbon radical having from 8 to 24 carbon atoms; $R_1$ is selected form the group consisting of an alkyl group having from 1-16 carbon atoms, a hydroxyalkyl group having from 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1-6 carbon atoms, a hydroxyalkyl group having from 1-6 carbon atoms, a benzyl group, a hydrogen atom, a group which, when taken together with the nitrogen, represents a heterocyclic radical, and any of such groups having a hydrogen atom replaced by a fluorine atom; and X— is an anionic counter ion; and a long-chain anionic foam stabilizer (2) having the formula (II):

where R' is an aliphatic hydrocarbon radical with 10 to 24 carbon atoms; $X_2^-$ is an anionic group selected from the group consisting of carboxylate, sulfate, sulfonate, and phosphate; and $Y^+$ is a cationic counter ion selected from the group consisting of ammonium, sodium, and potassium salt; wherein the long-chain organic cation formed from (I) and the long-chain organic anion formed from (II) are present in a weight ratio of from 0.05:1 to 15:1.

In producing large quantities such as several cubic foot of preformed foam of this kind, a 2-4% aqueous dilution of foam agent (1), with or without added fillers such as clay or thickeners, is fed into a two pumps foam generator such as Allied Foam Tech's AFT-G6. Compressed air, for example, at 80 psi is also fed into the generator through an electronically controlled solenoid valve. The preformed foam is then stabilized inside the foam generator with the foam stabilizer (2) that is fed through a second pump. After further homogenization through a plurality of mixing chambers within the foam generator, a very stable aqueous foam is produced. The preformed foam is then pumped into a cement mortar mixer with mixing paddles. Organic or mineral fibers of various kinds can then be added into the preformed foam under low shear paddle mixing.

A foamed cementitious or gypsum slurry of this invention can be made by either adding a fiber containing preformed foam under low shear mixing, for example, at a rotation speed less than 200 rpm, less than about 150 rpm, less than about 100 rpm, or less than about 50 rpm into a mortar mixer containing polymer dispersion, cement, fly ash, water reducer and fillers to produce an extremely stable and non-running foamed hydraulic slurry with very uniform fiber distribution, or the fiber and foam containing hydraulic substance slurry can be made by adding the organic or mineral fibers into a foamed hydraulic slurry including foam, polymer dispersion, cement, fly ash, water reducer and other filler additives.

The high fiber and polymer containing lightweight cement-fly ash composition includes fiber, aqueous foam and a polymer modified cement-fly ash mix. When the fiber is added into a preformed foam of this invention, it may be added in the amount of 0.5-30% by weight, for example, based on the hydraulic substances. The high fiber content may range from about 0.4-35%, about 0.5-30%, about 0.5-20%, about 0.5-15%, about 1-15, about 5-15%, 10-20%, or about 10-15% of the composition. Fibers with very different fineness, as expressed by the fiber thickness dtex, may have a range from about 2-350, about 2-100, or about 2-15. Fibers such as polyvinyl alcohol, nylon, polypropylene, basalt, rayon, acrylic or others are quite suitable for such purposes. When the fibers are added directly into a foamed cement-fly ash slurry of this invention, if the total amount of foam volume is less than 25% in the foamed slurry, the amount of fiber should not exceed 15% based on the hydraulic substances to avoid fiber balling. The fiber lengths may range from about ¼" to 2" lengths, preferably about ½" to about 1" lengths.

The cement-fly ash mix used in the composition of this invention can have Portland cement of various types at 5-95% mixed with 5-100% of a fly ash F or fly ash C. When 100% fly ash F is used, various activation methods using alkali citrates, silicates, calcium carbonate, lithium carbonate or other fly ash activators could be used. Fly ash C contains lime for the some degree of self-activation, the amount of other activators could be reduced or not be used at all.

The polymer(s) used in the foamed aqueous composition of the invention may comprise water-soluble or water-dispersible polymers and may be present up to 30% by weight of the hydraulic material. The foamed aqueous composition including the polymer(s) may be prepared by any well-known polymerization technique, such as for example suspension, emulsion dispersion, or solution polymerization. Aqueous emulsion polymerization techniques suitable for use in the present invention are discussed in detail in D. C. Blackley, *Emulsion Polymerization* (Wiley, 1975), which is incorporated herein for its teaching on aqueous emulsion polymerization techniques. The polymers present in the foamed aqueous composition can be dispersions of polyurethane, poly-acrylic copolymers, ethylene vinyl acetate copolymers, synthetic and natural rubber emulsions, polyisocyanate dispersions, aqueous urea formaldehyde solutions, and the like.

The composition of this invention may optionally contain the various fine powders such as kaolin, metakaolin, silica fume and limestone in the foam, in the hydraulic slurry or in both the foam and the slurry. Lightweight fillers used in the hydraulic slurry of this invention can be furnace slag, expanded clay, expanded shale, limestone, silica fume, vermiculite, perlite, expanded polystyrene beads and other fillers known to the industry. This effective slump controlling and fine filler containing foamed additive allows hydraulic slurries to achieve various desirable slump loss and rheological characteristics for the various manufacturing processes including extrusion, quick demolding, wet cast on various sheet-like coating substrates with controlled degree of wetting, slurry penetration and thickness build-up without running.

Water reducing additives used in the hydraulic slurries of this invention can be the conventional plasticizers or superplasticizers of sulfonates or carboxylates. Aggregates such as expanded clays, furnace slags, pumice, polystyrene beads, vermiculite, expanded shales or others known to the industry can be incorporated into the said composite for reduced cost, reduced weight, increased strength, accelerated setting. Curing agents for fly ash such as limestone, alkali silicate, lithium carbonate, alkali citrate, triethanoamine or other additives could be used. Accelerators for fly ash such as alkali citrate. Lithium carbonate and alkali silicate can be used.

Various powder fillers such as limestone powder, silica fume or others known to the industry can be incorporated into the said composite for reduced cost, improved rheology, better mechanical strength or other performance enhancement known to the art.

EXAMPLE 1

A stable aqueous foam is prepared with a two part foam system with foam agent (1) and a foam stabilizer (2) described above using a Kitchen Aid 10 speed blender with wire whisk. During the foam generation a 2.5% foam agent (1) aqueous solution is foamed at speed 8 for a few minutes, then 2.5% foam stabilizer (2) is added into the mixing bowl. After further foaming for a minute or so a very stable aqueous foam is formed, a mixing blade is then used to mix 12% by weight based on foam of ½ inch long polyvinyl alcohol (PVA) fibers into the preformed foam under low speed mixing at speed 2. The resulting foam is firm and stable with uniform fiber distribution without any fiber lump or fiber ball formation.

EXAMPLE 2

A stable aqueous foam is prepared with Allied Foam Tech's AFT G-6 foam generator and the two part foam system used in this invention with (A) 5% foam agent (1) mixed with 15% kaolin clay. The foam agent is fed into the generator with a positive displacement pump. An 80 psi compressed air is fed into the foam generator at the air-liquid mixing chamber and (B) the foam is further stabilized with a foam stabilizer (2) through a second positive displacement pump. 4 cubic feet of foam is fed into a 6 cubic foot capacity cement mortar mixer with mixing paddles. 14% by weight of foam of a ½ inch basalt fibers and 4% 1 inch long polypropylene fibers are added into the preformed foam in the paddle mixer. The resulting foam is thick with complete fiber distribution without any fiber lump or fiber ball formation.

EXAMPLE 3

In a Kitchen Aid mixer 300 grams cement and 700 grams fly ash are mixed with 0.8% naphthalenesulfonate superplasticizer, 250 grams water, 8% acrylic polymer Dow Rhoplex MC-76 based on a dry weight on the cement/fly ash mix, and 15% pre-foamed fiber containing foam from EXAMPLE 1 as a core mix. The low slump foam mix is cast into a ½ inch thick mold and the mold can be instantly removed while the cast maintains its shape nicely. A fiber scrim is laminated on the top and bottom surfaces of the core mix. The hardened half inch backerboard thus made is able to achieve a modulus of rupture (MOR) of >750 psi tested on a 3 point bending tester. The ½ inch thick backerboard has a dry density of 35-40 lbs. per cubic foot. Such high MOR is comparable to that of commercial cement backerboards at more than twice the density of the backerboard of this invention.

EXAMPLE 4

Use of 100% fly ash C, 8% acrylic polymer based on the dry weight of fly ash, 22% water based on the weight of fly ash, 0.8% naphthalenesulfonate superplasticizer, and 20% fiber containing foam of EXAMPLE 1, we are able to produce flexible roof shingle pieces at a required thickness of 110-130 mils using only one piece of fiberglass scrim or mat in the middle of the core mix. Colored stones are applied to the top surface of the wet sheet, this is followed by light pressing. The dried roof shingle piece is totally asphalt free, has a density of 35 lbs. per cubic foot and unlike the stiffer asphalt shingle counterpart the asphalt free shingle of this invention can form a roll with 3 inch diameter core without any crack formation.

EXAMPLE 5

Use of 100% fly ash F, 12% acrylic polymer based on the dry weight of fly ash, 22% water based on the weight of fly ash, 0.8% naphthalenesulfonate superplasticizer, and 20% fiber containing foam of EXAMPLE 1, we are able to produce flexible roof shingle pieces at a required thickness of 110-130 mils using only one piece of fiberglass scrim or mat in the middle of the core mix. Colored stones are applied to the top surface of the wet sheet, this is followed by light pressing. The dried roof shingle piece has a density of 35 lbs. per cubic foot. Unlike the typical commercial grade asphalt shingles, the flexible shingle sheet of this invention can form a roll at a 3 inch diameter core without any crack formation. It also shows comparable tear strength, fire resistance, freeze-thaw stability and significantly better UV resistance than that of the commercial asphalt shingles.

EXAMPLE 6

A flexible roof underlayment at a thickness of 50-70 mils is made from 120 grams limestone, 35 grams of water and 20 grams fly ash C, 41 grams of acrylic polymer (dry weight), 30 grams of fiber containing foam of EXAMPLE 1. The low slump foamed slurry was applied onto an alkali resistant fiberglass mat. The dried piece passed a mandrel bending at a diameter of 3 inches without cracking. The sheet has <7% water absorption and passed the 5 inch static column water test without leakage for greater than 48 hours.

EXAMPLE 7

A flexible roof underlayment at a thickness of 50-70 mils is made from 140 grams fly ash F, 41 grams of acrylic polymer (dry weight based on fly ash), 35 grams of water, 30 grams of fiber containing foam of EXAMPLE 1. The low slump foamed slurry was applied onto an alkali resistant fiberglass mat. The dried piece passed a mandrel bending at a diameter of 3 inches without cracking. The sheet has <7% water absorption and passed the 5 inch static column water test without leakage for greater than 48 hours.

EXAMPLE 8

The same composition of this invention as in EXAMPLE 7 but the wet fly ash core is laminated onto a galvanized steel sheet at a coating thickness of 60 mils and with granules coated on the top surface. The dried specimen showed great adhesion to the steel substrate. No edge delamination, nor layer separation when the coated metal piece was bent 360 degrees into a sharp kink. Such composition is suitable for making contoured or high profiled lightweight metal roof tiles.

EXAMPLE 9

A 0.25 inch thick cement backerboard is made from 125 grams expanded clay, 37 grams of acrylic polymer (dry weight), 67 grams of pre-foamed aqueous foam with 7 grams of PVA fibers, 3 grams of polypropylene fibers, 50 grams of water, 130 grams of Portland cement Type I, 200 grams of fly ash F and 3 grams of naphthalenesulfonate superplasticizer. An alkali resistant fiberglass scrim is laminated to the top and bottom of the 0.25 inch low slump slurry without the need of a mold. The room temperature dried piece has a modulus of rupture greater than 1,000 psi and an indented compressive strength of greater than 1,000 psi.

EXAMPLE 10

A 0.5 inch thick cement backerboard was made with a composition and process the same as in EXAMPLE 9, and the room temperature dried piece has a modulus of rupture greater than 750 psi required for cement backerboard.

EXAMPLE 11

A 1" diameter plastic tube of 5" in height is glued to the surface of a 0.5 inch thick cement backerboard piece of claim 10. The tube is filled with water to a height of 5 inches. No water is leaked out from the backerboard sample for >48 hours. This makes the backerboard of this invention much more water resistant than any of the 0.5 inch commercial backerboards in the market.

EXAMPLE 12

A 1" diameter plastic tube of 24" in height is glued to the surface of a 0.25 inch thick cement backerboard piece of claim 9. The tube is filled with water to a height of 24 inches. No water is leaked out from the backerboard sample for >48 hours. This makes the backerboard of this invention much more water resistant than any of the 0.25 inch commercial backerboards in the market.

EXAMPLE 13

A thin coating of an acrylic Dow Rhoplex MC-76 dispersion (at a dried thickness of <8 mils) applied to the top surface of the backerboards. In EXAMPLE 9 and EXAMPLE 10, a 24 inches water column test similar to that in EXAMPLE 12 is performed on both samples. No water leak from either tube for >48 hours. This makes the backerboard of this invention qualified for use in wet areas (sauna, bathroom or steam room), while no other commercial cement backerboards could do without the use of a water barrier coating or barrier sheet.

EXAMPLE 14

In an exterior wall wrap application, a colored stone coated flexible sheet of claim 6 with a red brick pattern and a thickness of 110-130 mils in is made. The decorative wall wrap is able to form a roll with a core diameter of <3 inches. There is no cracking nor any loss of the coated granules when the roll is unwound.

EXAMPLE 15

A 1 inch thick and 5×5 inch square block made from 330 grams fly ash C, 70 grams of water, 6% acrylic polymer (dry weight based on the total weight of fly ash c and expanded clay), 290 grams expanded clay, 45 grams of fiber containing pre-foamed foam prepared according to EXAMPLE 1. The room temperature cured block at a density of 45 lbs. per cubic foot is able to be saw-cut with a typical table saw and wood-cutting blade. The pieces sliced off at a thickness of as little as ⅛th of an inch maintain their integrity without breakage or chipping, similar to that of a standard wood piece but without the flammability associated with wood. The cut line also is smooth without any chipping. The block also shows high impact strength by surviving a free drop from a height of 6 foot above a concrete floor without breakage. Such behavior is unachievable by conventional cement or concrete pieces at similar densities or even at 2× to 3× the densities.

EXAMPLES 16-20

In these examples 5 pieces of cement/fly ash F foam mixes of different Portland cement Type I to fly ash F ratios are made at a dry density of 40 lbs. per cubic foot and dimensions of 10"×3"×0.25" each. The detailed composition and the 3 point bending strength of the cured samples are given in TABLE 1.

TABLE 1

Bending Strength of Foamed Fiber Cement Mixes at Different Levels of Fly Ash F

|  | EXAMPLE 16 | EXAMPLE 17 | EXAMPLE 18 | EXAMPLE 19 | EXAMPLE 20 |
| --- | --- | --- | --- | --- | --- |
| polymer (dry weight) | 36 | 36 | 36 | 36 | 36 |
| Cement | 300 | 200 | 150 | 100 | 0 |
| Fly ash F | 0 | 100 | 150 | 200 | 300 |
| Fiber containing foam of EXAMPLE 1 | 60 | 60 | 60 | 60 | 60 |
| Superplasticizer (naphthalenesulfonate) | 2 | 2 | 2 | 2 | 2 |
| Expanded clay | 130 | 130 | 130 | 130 | 130 |
| bending strength | 270 psi | 315 psi | 335 psi | 415 psi | 180 psi |

TABLE 1 shows that the bending strength of all the cement/fly ash mixes (EXAMPLE 17-EXAMPLE 19) are higher than that made of 100% cement (EXAMPLE 16) or that made of 100% fly ash (EXAMPLE 20).

The lower bending strength of the all cement system in EXAMPLE 16 is most likely from the pre-mature breakage of the sample due to the brittleness of cement, while that with 100% fly ash F (EXAMPLE 20) could be explained by the typical low hardness development of fly ash. The other 3 examples (EXAMPLES 17-19) with higher bending strength most likely derive their strength from the fly ash F activation by cement and the toughness without shrinkage cracking by the high fiber content and the acrylic polymer. We will expect similar results from the use of fly ash C, of course the amount of cement used can be reduced to make the total lime content in the fly ash C preparation comparable to that in the cement-fly ash F preparations.

Figure 1:
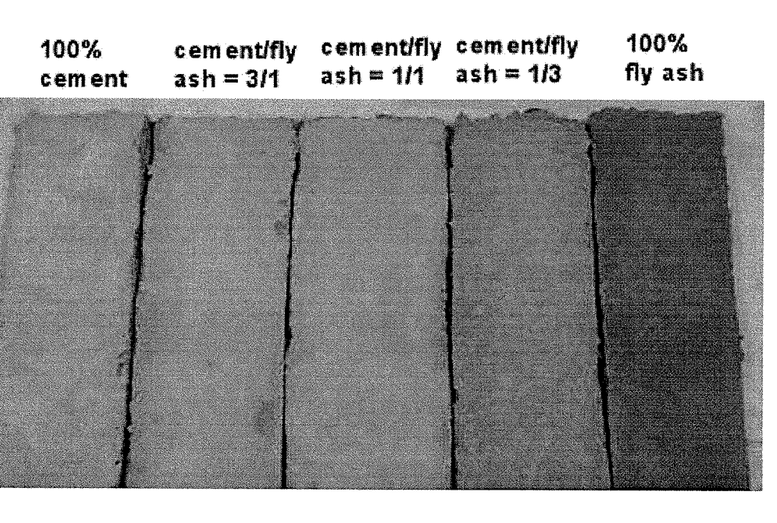
The FIGURE shows 5 foam-fiber based cementitious panels at different cement to fly ash F ratios. All the panels, including that with 100% cement (first panel on the left of FIG. 1), are free of any shrinkage crackings.

FIG. 1 shows the five cementious panels of EXAMPLES 16 to 20. All panels, including that with 100% cement (EXAMPLE 16 on the left of FIG. 1), are free of any shrinkage cracking.

EXAMPLE 21

300 grams of a fiber containing stable aqueous foam according to EXAMPLE 1 is added into a cement slurry of 1,000 grams of Portland cement Type I, 8 grams of naphthalenesulfonate superplasticizer, 250 grams of water and 2,000 grams of expanded clay. The composite, after room temperature drying and cure, formed a lightweight composite that is hard and with high toughness and tensile strength without any crack formation.

EXAMPLE 22

A dry package of flexible cement and fly ash mix that is ready to make the composition of EXAMPLE 3 by simply adding water and mix the slurry that is formed with the fiber containing preformed foam of EXAMPLE 1. The dry package is a blend of 700 grams of fly ash F, 300 grams of Portland cement Type I, 80 grams of a powdered form acrylic polymer modifier Dow Drycryl DP-2903 and 8 grams of powdered form of naphthalenesulfonate superplasticizer. Such dry package of the composition of this invention allows easy handling and shipping, especially for onsite operations of various scales.

EXAMPLE 23

A dry package of flexible cement and fly ash mix as in EXAMPLE 22 that has additionally added 400 grams of expanded clay at a particle size range from 0.5 to 2.5 mm or a particle size range from 2.0 to 4.0 mm.

EXAMPLE 24

A dry package of flexible cement and fly ash mix that is ready to make the composition of EXAMPLE 3 by simply adding water and mix the slurry that is formed with the fiber containing preformed foam of EXAMPLE 1. The dry package is a blend of 900 grams of fly ash C, 100 grams of Portland cement Type I, 80 grams of a powdered form acrylic polymer modifier Dow Drycryl DP-2903 and 8 grams of powdered form of naphthalenesulfonate superplasticizer.

EXAMPLE 25

Using a mixing blade in a Kitchen Aid mixer a foamed slurry is prepared by adding 150 grams of a preformed aqueous foam into a slurry containing 300 grams cement, 700 grams fly ash, 8 grams of naphthalenesulfonate superplasticizer, 250 grams of water, 160 grams of a Dow Rhoplex MC-76 acrylic polymer. 15 grams of polyvinyl alcohol fiber is then added into the foamed slurry. The foamed slurry is cast into a ½ inch thick mold and the room temperature cured cementitious sheet has good tensile strength, water resistance without any shrinkage cracking.

Although the invention has been described in detail and with reference to specific embodiments, it will be apparent to one skilled in the art that various changes and modifications can be made without departing from the spirit and scope of the invention. Thus, it is intended that the invention covers the modifications and variations of this invention provided they come within the scope of the appended claims and their equivalents. It is expressly intended, for example, that all ranges broadly recited in this document include within their scope all narrower ranges which fall within the broader ranges. It is also expressly intended that the steps of the methods disclosed above are not restricted to any particular order. The references cited in this document are each incorporated herein by reference in their entireties for all purposes.

What is claimed:

1. A foamed fiber composition comprising:
    a hydraulic mixture including (i) a polymer and (ii) one or more of gypsum, fly ash, and cement;
    a foam including a foaming agent, a foam stabilizer, and 0.5-35% fibers by weight,
    wherein the fibers have a fineness of 2-350 dtex;
    wherein the foaming agent has the general formula (I):

(I)

where R is an aliphatic hydrocarbon radical having from 8 to 24 carbon atoms; $R_1$ is selected form the group consisting of an alkyl group having from 1-16 carbon atoms, a hydroxyalkyl group having from 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1-6 carbon atoms, a hydroxyalkyl group having from 1-6 carbon atoms, a benzyl group, a hydrogen atom, a group which, when taken together with the nitrogen, represents a heterocyclic radical, and any of such groups having a hydrogen atom replaced by a fluorine atom; and $X^-$ is an anionic counter ion; and
    wherein the foam stabilizer has the general formula (II):

(II)

where R' is an aliphatic hydrocarbon radical with 10 to 24 carbon atoms; $X_2$ is an anionic group selected from the group consisting of carboxylate, sulfate, sulfonate, and phosphate; and Y is a cationic counter ion selected from the group consisting of ammonium, sodium, and potassium salt.

2. The composition of claim 1, wherein the foam comprises 5-90% by volume of the composition.

3. The composition of claim 1, wherein the fibers comprise one or more of the group consisting of polyvinyl alcohol, nylon, polypropylene, basalt, rayon, cellulose, steel, wood, aramid, polyester, and acrylic.

4. The composition of claim 1, wherein the fly ash includes fly ash F, fly ash C, or a mixture thereof and the cement is portland cement.

5. The composition of claim 1, wherein the polymer has a concentration of up to 30% by dry weight of the hydraulic substance.

6. The composition of claim 1, wherein the polymer is selected from the group consisting of polyurethane, polyacrylic copolymers, ethylene vinyl acetate copolymers, synthetic and natural rubber emulsions, polyisocyanate dispersions, aqueous urea formaldehyde solutions, and mixtures thereof.

7. The composition of claim 1, further comprising one or more of:
    a fly ash activator selected from the group consisting of alkali citrates, silicates, calcium carbonate, lithium carbonate, and mixtures thereof;
    a rheology modifier selected from the group consisting of kaolin, meta kaolin, silica fume, limestone, and mixtures thereof;
    an aggregate material selected from the group consisting of expanded clays, furnace slags, pumice, polystyrene beads, vermiculite, expanded shales, and mixtures thereof; and
    a plasticizer or superplasticizer.

8. A flexible, water resistant and weather resistant roof tile composite comprising the foamed fiber composition of claim 1 surrounding a fiberglass mat core, the roof tile composite having a thickness of 100-150 mm.

9. A flexible, water resistant and weather resistant roof tile composite comprising the foamed fiber composition of claim 1 applied to a metallic backing.

10. A flexible, water resistant and weather resistant underlayment comprising the foamed fiber composition of claim 1 applied to a fiberglass mat or scrim, the underlayment having a thickness of 50-155 mm.

11. A strong and lightweight cement backerboard comprising the foamed fiber composition of claim 1 sandwiched between a first fiberglass scrim or mat and a second fiberglass scrim or mat.

12. A flexible, abrasion resistant and lightweight foamed cement composite comprising the foamed fiber composition of claim 1 applied to an alkali-resistant fiberglass scrim or mat.

13. A flexible foamed cementitious composite comprising the foamed fiber composition of claim 1 applied to an organic panel.

14. A foam fill for sandwich panels, wall cavities, flooring, and roof coatings comprising the foamed fiber composition of claim 1.

15. A brick comprising the foamed fiber composition of claim 1.

16. A cement siding comprising the foamed fiber composition of claim 1.

17. The composition of claim 1, wherein the content of the fibers is 0.5-15% by weight.

18. The composition of claim 1, wherein the fibers are uniformly distributed in the foamed fiber composition without shrinkage cracking.

19. The composition of claim 1, wherein the fibers are uniformly distributed in the foamed fiber composition without fiber lump or fiber ball.

20. The composition of claim 1, wherein the foamed fiber composition has a modulus of rupture (MOR) larger than 750, wherein the MOR is measured on a 3-point bending test with respect to the composition at a thickness of 0.5 inch.

21. A process for forming a foamed fiber composition, the process comprising:
providing a stable foam including a foaming agent and a foam stabilizer;
mixing fibers into the stable foam until the fibers are uniformly distributed in the foam to form a fiber-containing foam, wherein the fiber-containing aqueous foam contains 0.5-35% fibers by weight, and wherein the fibers have a fineness of 2-350 dtex;
mixing the fiber-containing foam into a hydraulic slurry including (i) a polymer and (ii) one or more of gypsum, fly ash, and cement;
wherein the foaming agent has the general formula (I):

(I)

where R is an aliphatic hydrocarbon radical having from 8 to 24 carbon atoms; $R_1$ is selected form the group consisting of an alkyl group having from 1-16 carbon atoms, a hydroxyalkyl group having from 1-16 carbon atoms, a benzyl group, a group which, when taken together with the nitrogen, represents a heterocyclic radical, and any of such groups having a hydrogen atom replaced by a fluorine atom; $R_2$ and $R_3$ are selected form the group consisting of an alkyl group having form 1-6 carbon atoms, a hydroxyalkyl group having from 1-6 carbon atoms, a benzyl group, a hydrogen atom, a group which, when taken together with the nitrogen, represents a heterocyclic radical, and any of such groups having a hydrogen atom replaced by a fluorine atom; and $X^-$ is an anionic counter ion; and
wherein the foam stabilizer has the general formula (II):

$$R'-X_2^-Y^+ \quad (II)$$

where R' is an aliphatic hydrocarbon radical with 10 to 24 carbon atoms; $X_2$ is an anionic group selected from the group consisting of carboxylate, sulfate, sulfonate, and phosphate; and Y is a cationic counter ion selected from the group consisting of ammonium, sodium, and potassium salt.

22. The process of claim 21, wherein the fiber-containing foam mixed into the hydraulic slurry has a volume of 5-90% of the volume of the hydraulic slurry.

23. The process of claim 21, wherein the polymer has a concentration of up to 30% by dry weight of the hydraulic substance.

24. The process of claim 21, wherein the polymer is selected from the group consisting of polyurethane, polyacrylic copolymers, ethylene vinyl acetate copolymers, synthetic and natural rubber emulsions, polyisocyanate dispersions, aqueous urea formaldehyde solutions, and mixtures thereof.

25. The process of claim 21, wherein the fibers are mixed into the stable aqueous foam at a rotation speed of less than 300 rotations per minute.

26. The process of claim 21, further comprising incorporating one or more of the following compounds into the foamed fiber composition:
a fly ash activator selected from the group consisting of alkali citrates, silicates, calcium carbonate, lithium carbonate, and mixtures thereof;
a rheology modifier selected from the group consisting of kaolin, metakaolin, silica fume, limestone, and mixtures thereof;
an aggregate material selected from the group consisting of expanded clays, furnace slags, pumice, polystyrene beads, vermiculite, expanded shales, and mixtures thereof; and
a plasticizer or superplasticizer.

* * * * *